United States Patent Office 2,787,523
Patented Apr. 2, 1957

2,787,523

REMOVAL OF CHLORINE FROM HCl

William L. Wilson, Barberton, Ohio, assignor to Columbia-Southern Chemical Corporation, Allegheny County, Pa., a corporation of Delaware No Drawing. Application February 23, 1952,
Serial No. 273,139

6 Claims. (Cl. 23—154)

This invention relates to a method of removing free chlorine from HCl.

Commercially available HCl when produced by chlorination of hydrocarbons frequently contains free chlorine which renders the HCl undesirable for particular industrial purposes. For instance, one commercial source of hydrogen chloride is derived from chlorination of hydrocarbons, such as benzene, methane, propane, and the like. Hydrogen chloride produced by this method contains an undesirable content of free chlorine. In general, this amount of free chlorine exceeds 40 parts per million, and frequently amounts to from 100 up to 2000 parts per million by weight of the hydrogen chloride. Resort to various physical processes, such as fractional distillation, evaporation, adsorption, and the like in an effort to remove this free chlorine, has proven unsuccessful either in its efficiency of removal of the free chlorine and/or because of economical considerations.

According to the instant invention, I have discovered that free chlorine can be removed from HCl by adding a hydroxylamine thereto. In practice, hydroxylamines are added to aqueous solutions of hydrogen chloride to remove the free chlorine. Hydrochloric acids of all strengths may be treated by resort to this method although, normally, commercial strengths of acids, usually containing in excess of 30 percent by weight of hydrogen chloride are subjected to treatment according to the present process.

Hydroxylamines in general will remove chlorine for the purposes of this invention. Hydroxylamine and strong inorganic acid salts thereof such as hydroxylamine hydrochloride, hydroxylamine nitrate, and hydroxylamine sulfate, for example, all may be used in performing this invention either individually or in combination with each other. Organic hydroxylamines, such as phenyl hydroxylamine are also satisfactory. A determining factor in the selection of any specific hydroxylamine involves an evaluation of the ultimate use of the acid. In instances where the presence of a trace of sulphuric acid in the ultimate chlorine free HCl is immaterial, hydroxylamine sulfate will be as effective as other hydroxylamines. On the other hand, should traces of sulphuric acid be undesirable, resort to hydroxylamines, such as hydroxylamine hydrochloride, is necessary.

This invention has been successfully practiced by simply adding the desirable hydroxylamine compound to HCl. Hydroxylamine compounds, either in their crystalline form or in aqueous solution, have been employed, while the HCl may be gaseous or liquid hydrogen chloride which may contain little or no water or may be in solution as hydrochloric acid.

The concentration of the hydroxylamine when it is added as a solution is not critical, and solutions of any convenient strength may be employed. Preferably, solutions of reasonable strength should be used to avoid the presence of an undue amount of solvent in the treated HCl. Conceivably, the use of very dilute solutions of hydroxylamine may effect the strength of the final chlorine-free acid. Hydroxylamine solutions of approximately 10 percent by weight of hydroxylamine, and above, provide suitable results without materially reducing the strength of the final chlorine-free acid.

Normally, when hydroxylamine solutions are employed, water is the solvent. Aqueous solutions are preferable because water does not contaminate HCl. This is essentially true because water vapor is usually present in hydrogen chloride (gaseous state) and hydrochloric acid is itself an aqueous solution. When water is the solvent for the hydroxylamine, it is necessary, however, to avoid the use of very hot water since several of the hydroxylamines decompose therein. Non-aqueous liquids which may be used as satisfactory solvents for the hydroxylamine are those liquids which are chemically inert with respect to hydroxylamines and HCl. Controlling factors in selecting a hydroxylamine solvent are (1) chemical inertness with respect to the hydroxylamine and HCl and (2) contaminating effect on the final chlorine-free acid. The latter requisite for the solvent depends on the ultimate use of the HCl. Thus, while a particular nonaqueous solvent may prove undesirable when the HCl is destined for one use, it may be entirely satisfactory when the HCl is to be employed for other purposes.

Selection of the exact amount of hydroxylamine to be added is dependent upon the amount of free chlorine to be removed. Experimentation has shown that approximately 5 moles of chlorine are removed for every 2 moles of hydroxylamine added.

The reaction probably occurs in accordance with the following equation when hydroxylamine is used:

$$2NH_2OH + 5Cl_2 + 2H_2O \rightarrow 10HCl + 2NO_3$$

Other hydroxylamines react similarly with the chlorine to effect free chlorine removal.

Generally, sufficient amounts of hydroxylamine are usually added so that the free chlorine content is reduced to below 40 parts per million of the acid. However, all the free chlorine may be removed by merely adding an amount of hydroxylamine based upon the premise that each hydroxylamine radical will remove approximately 2½ moles of free chlorine.

Addition of the hydroxylamines is effected at room temperatures although the invention may be practiced at any temperature which does not adversely affect the HCl and which will not decompose the hydroxylamines. While the invention is normally performed at atmospheric pressures, favorable results may be achieved at sub atmospheric or super atmospheric pressures.

The reaction of the hydroxylamine with chlorine is essentially simultaneous, and free chlorine is removed instantaneously from the acid. For practical purposes, however, it is advisable to agitate the mixture of the acid and hydroylamine to achieve better and more rapid distribution of the hydroxylamine in the acid. Agitation for 2 hours in commercial operations generally achieves the desired result. Shorter or longer periods are also satisfactory. It is to be recognized that the practical result of agitation is distribution of the hydroxylamine to enhance and speed the dissolving thereof in the acid medium. Consequently, selection of the actual agitation period is a function of the amount of acid that is involved, the approximate amount of hydroxylamine involved, the manner in which the acid and hydroxylamine are initially brought in contact and the speed at which the chlorine removal is desired to take place.

As can be readily realized from the foregoing description of this invention, one advantage that accrues from the use thereof is its simplicity. All that is required to remove free chlorine is that the hydroxylamine be added to the acid. This can be effected by slowly adding, such as dropwise, a solution of the hydroxylamine into a drum of acid at any convenient time such as prior to shipment or upon receipt of the drum. Agitation of the barrel by merely rolling it around or by the insertion of a stirring mechanism suffices to distribute the hydroxylamine and expedite the removal of the free chlorine. Samples of the acid may be withdrawn at given intervals for analysis to determine the actual amount of chlorine remaining.

The following examples illustrate the process:

EXAMPLE I

To 500 grams of an aqueous solution of hydrochloric acid containing 32 percent by weight of HCl and 92 parts per million of free chlorine was added 0.03 gram of essentially pure hydroxylamine hydrochloride at room temperature and atmospheric pressure. The mixture was agitated for 15 minutes and the free chlorine content remaining in the acid determined. By this time the free chlorine in the acid had dropped to 77 parts per million. After standing for one hour without agitation, the acid was found to contain 49 parts per million of free chlorine, and after standing overnight without agitation, the acid contained 47 parts per million of chlorine.

EXAMPLE II

Five hundred grams of an aqueous solution of hydrochloric acid containing 32 percent by weight of HCl and containing 85 parts per million of free chlorine was agitated for one hour at room temperature and atmospheric pressure after 0.060 gram of essentially pure hydroxylamine hydrochloride was added thereto. Analysis of a sample of the treated acid revealed only 1 part per million of free chlorine.

EXAMPLE III

Two 500-gram samples of aqueous solutions of the hydrochloric acid containing 35 percent by weight of HCl and 72 and 79 parts per million of free chlorine respectively were treated with hydroxylamine hydrochloride to determine the stoichiometric relation between the hydroxylamine added and the free chlorine removed. In these two experiments, the hydroxylamine hydrochloride was added as an aqueous solution containing 10 percent by weight of hydroxylamine hydrochloride. The experiments were carried out at atmospheric pressure and room temperature. The results of these tests are recorded in the table below.

Table

| Weight of Acid (grams) | $Cl_2$ in Acid (p. p. m.)[1] | $NH_2OH \cdot HCl$ Added (grams) | Time of Treatment (hours) | $Cl_2$ in Treated Acid (p. p. m.)[1] | $Cl_2$ destroyed (grams) | Moles $Cl_2$ per mole $NH_2OH$ |
|---|---|---|---|---|---|---|
| 500 | 72 | 0.01583 | 0.5 | 15 | 0.0285 | 1.76 |
| 500 | 79 | 0.00841 | 0.3 | 36 | 0.0215 | 2.50 |

[1] Parts per million.

Other modifications and variations will be apparent to one skilled in the art, and are possible without departing from the spirit and scope of this invention as defined in the following claims.

What is claimed is:

1. In the process of supplying hydrochloric acid to commerce, the improvement which comprises adding a small amount of hydroxylamine to aqueous hydrochloric acid containing a minor quantity of free chlorine whereby to reduce the free chlorine content thereof and supplying the resulting hydrochloric acid for industrial use.

2. In the process of supplying hydrochloric acid to commerce, the improvement which comprises a small amount of a hydroxylamine selected from the group consisting of hydroxylamine and the strong inorganic acid salts thereof to aqueous hydrochloric acid containing a minor quantity of free chlorine whereby to reduce the free chlorine content thereof and supplying the resulting hydrochloric acid for industrial use.

3. In the process of supplying hydrochloric acid to commerce, the improvement which comprises adding a small amount of a hydroxylamine to aqueous hydrochloric acid containing at least about 30 percent hydrogen chloride by weight and containing a minor quantity of free chlorine whereby to reduce the free chlorine content thereof and supplying the resulting hydrochloric acid for industrial use.

4. In the process of supplying hydrochloric acid to commerce, the improvement which comprises adding a small amount of a hydroxylamine to aqueous hydrochloric acid having a hydrogen chloride content of at least about 30 percent by weight and containing a minor quantity of free chlorine in excess of 40 parts per million by weight of the hydrogen chloride in said acid, adding sufficient amount of the hydroxylamine to reduce the free chlorine content of said acid below 40 parts per million and supplying the resulting hydrochloric acid for industrial use.

5. In the process of supplying hydrochloric acid derived from the chlorination of organic compounds to commerce, the improvement which comprises adding a small amount of a hydroxylamine to aqueous hydrochloric acid containing a minor quantity of free chlorine as an incident to the organic chlorination whereby to reduce the free chlorine content of the acid and supplying the resulting acid for industrial use.

6. In the process of supplying hydrochloric acid to commerce, the improvement which comprises adding a small amount of hydroxylamine hydrochloride to aqueous hydrochloride acid containing a minor quantity of free chlorine whereby to reduce the free chlorine content thereof and supplying the resulting hydrochloric acid for industrial use.

References Cited in the file of this patent

Mellor's "Comprehensive Treatise on Inorganic and Theoretical Chem.," vol. 8, 1928 ed., page 300, Longmans, Green & Co., New York.

J. T. Baker Chemical Company's Catalog (July 1951 ed.), page 103. Phillipsburg, N. J.

Mellor's "Comprehensive Treatise on Inorganic and Theoretical Chem.," vol. 8, 1928 ed., page 304, Longmans, Green and Co., New York.

Comey and Hahn: "A Dictionary of Chemical Solubilities-Inorganic," 1921 ed., page 387. The MacMillan Co., N. Y.

UNITED STATES PATENT OFFICE

CERTIFICATE OF CORRECTION

Patent No. 2,787,523 April 2, 1957

William L. Wilson

It is hereby certified that error appears in the printed specification of the above numbered patent requiring correction and that the said Letters Patent should read as corrected below.

Column 4, list of references cited, directly after the heading "References Cited in the file of this patent" insert the following:

UNITED STATES PATENTS 2,347,257 Frost--------Apr. 25, 1944

OTHER REFERENCES

Mellor's "A Comprehensive Treatise on Inorganic and Theoretical Chem.," vol. 2, 1922 ed., page 165, Longmans, Green and Co., New York.

Signed and sealed this 6th day of May 1958.

(SEAL)
Attest:
KARL H. AXLINE
Attesting Officer

ROBERT C. WATSON
Commissioner of Patents